(12) United States Patent
Teragawa

(10) Patent No.: US 10,088,619 B2
(45) Date of Patent: Oct. 2, 2018

(54) REFLECTION SHEET, LIGHT SOURCE DEVICE AND DISPLAY APPARATUS

(71) Applicant: Sakai Display Products Corporation, Sakai-shi, Osaka (JP)

(72) Inventor: Daisuke Teragawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 182 days.

(21) Appl. No.: 14/650,847

(22) PCT Filed: Apr. 2, 2014

(86) PCT No.: PCT/JP2014/059771
§ 371 (c)(1),
(2) Date: Jun. 9, 2015

(87) PCT Pub. No.: WO2014/168061
PCT Pub. Date: Oct. 16, 2014

(65) Prior Publication Data
US 2016/0170124 A1    Jun. 16, 2016

(30) Foreign Application Priority Data
Apr. 8, 2013  (JP) ................................. 2013-080703

(51) Int. Cl.
*F21V 8/00* (2006.01)
*G02F 1/1335* (2006.01)

(52) U.S. Cl.
CPC .......... *G02B 6/0031* (2013.01); *G02B 6/0055* (2013.01); *G02B 6/0088* (2013.01); *G02F 1/133615* (2013.01)

(58) Field of Classification Search
USPC ......................................................... 362/609
See application file for complete search history.

(56) References Cited

U.S. PATENT DOCUMENTS

2006/0139960 A1 *  6/2006  Sakai ................... G02B 6/0043
                                                          362/623
2007/0236626 A1 * 10/2007  Koganezawa ....... G02B 6/0083
                                                           349/61

(Continued)

FOREIGN PATENT DOCUMENTS

JP      2006-210309 A      8/2006
JP      2007-265882 A     10/2007

(Continued)

*Primary Examiner* — Michael G Lee
*Assistant Examiner* — David Tardif
(74) *Attorney, Agent, or Firm* — Rudy J. Ng; Bret E. Field; Bozicevic, Field & Francis LLP

(57) ABSTRACT

Provided are a reflection sheet which is capable of, when light sources, and the like are disposed on one side surface side of a light guide plate, preventing the reflection sheet from coming into contact with the light sources, and the like at a central part of the one edge thereof, and a light source device and a display apparatus. A reflection sheet which is oppositely disposed to the other surface of a light guide plate for emitting light made incident on one side surface from one surface thereof, and reflects the light made incident on the light guide plate to the one surface side of the light guide plate, includes a cutout part provided at a central part of one edge of four sides of the rectangular reflection sheet, and the reflection sheet is arranged so that the one edge is disposed on one side surface side of the light guide plate.

15 Claims, 15 Drawing Sheets

(56) References Cited

U.S. PATENT DOCUMENTS

| | | | | |
|---|---|---|---|---|
| 2010/0135003 | A1* | 6/2010 | Huang | G02F 1/133608 362/97.2 |
| 2010/0259949 | A1* | 10/2010 | Ye | G02B 6/0055 362/607 |
| 2011/0128468 | A1 | 6/2011 | Koganezawa | |
| 2013/0021821 | A1* | 1/2013 | Yoon | G02F 1/1335 362/612 |
| 2013/0051076 | A1* | 2/2013 | Mizuno | G02B 6/002 362/613 |
| 2013/0083270 | A1* | 4/2013 | Obata | G02B 6/0088 349/65 |
| 2013/0107135 | A1* | 5/2013 | Yokawa | G02F 1/133308 348/794 |
| 2013/0114021 | A1* | 5/2013 | Iiyama | G02B 19/0009 349/64 |
| 2013/0121024 | A1* | 5/2013 | Barth | G02B 6/0038 362/607 |
| 2013/0135538 | A1* | 5/2013 | Kuromizu | G02B 6/0031 348/790 |
| 2013/0257704 | A1* | 10/2013 | Wei | G02B 6/0068 345/102 |
| 2014/0340586 | A1* | 11/2014 | Terashima | G02B 6/0055 348/790 |

FOREIGN PATENT DOCUMENTS

| | | |
|---|---|---|
| JP | 2007-279480 A | 10/2007 |
| JP | 2008-112663 A | 5/2008 |
| JP | 2009-081089 A | 4/2009 |
| WO | WO2013039001 A1 | 3/2013 |

* cited by examiner

US 10,088,619 B2

REFLECTION SHEET, LIGHT SOURCE DEVICE AND DISPLAY APPARATUS

This application is the national phase under 35 U.S.C. § 371 of PCT International Application No. PCT/JP2014/059771 which has an International filing date of Apr. 2, 2014 and designated the United States of America.

BACKGROUND

1. Technical Field

The present invention relates to a reflection sheet which reflects light made incident through a side surface of a light guide plate therein to a side of one surface of the light guide plate and is oppositely disposed to the other surface of the light guide plate, and a light source device and a display apparatus including the reflection sheet.

2. Description of Related Art

In the case of a so-called edge light type light source device which irradiates a liquid crystal panel with light from a side surface side thereof, the liquid crystal panel includes, on a rear side thereof, a light guide plate which guides light from a light source to the liquid crystal panel, and a reflection sheet which reflects the light made incident on the light guide plate from the light source to the liquid crystal panel side.

However, recently, the size of the liquid crystal display apparatus is becoming larger, and thereby absolute values of dimensional tolerances for the respective components included in the liquid crystal display apparatus has also been increased. Therefore, when the respective components are assembled as a product, a gap may occur between the components, such that there is a problem that luminance unevenness on a display screen may occur due to the gap.

In relation to the above-described problem, Japanese Patent Application Laid-open No. 2007-265882 discloses a backlight unit of an edge light type backlight unit which includes a cold-cathode fluorescent lamp disposed on a side surface side of a light guide plate, a reflection sheet disposed on a rear surface (non-light emitting surface) side of the light guide plate, and a reflector which supports the reflection sheet from the rear face and covers the cold-cathode fluorescent lamp, to reflect light from the cold-cathode fluorescent lamp to the light guide plate, wherein a convex-shaped part protruding to the reflection sheet side is provided on the reflector, a spacer is arranged between the reflector and the reflection sheet, and an end of the reflection sheet is bent toward the light guide plate side, such that a ridge line of the light guide plate and the reflection sheet forcibly come into contact with each other, to suppress irregular reflection of the light on the ridge line.

SUMMARY

Meanwhile, as described above, in the case of the liquid crystal display apparatus using the light guide plate and the reflection sheet, in order to prevent incidence of light from the non-light emitting surface of the light guide plate and leakage of light from the non-light emitting surface, the reflection sheet is configured so as to protrude to a light source side from a distal end surface of the light guide plate.

However, in the case of a large liquid crystal display apparatus employing the edge light type in which the light source is arranged on a lower side of the light guide plate, by overlapping situations such as the reflection sheet sagging downward at a central part thereof due to its own weight, and the light source partially approaching the light guide plate side, a problem that the protruded distal end surface of the reflection sheet comes into contact with the light source may occur.

FIGS. 14 and 15 are views describing a problem occurring in a conventional liquid crystal display apparatus.

FIGS. 14 and 15 illustrate an example of the liquid crystal display apparatus including a light source 3, a light guide plate 5 which guides light from the light source 3 on the lower side to optical sheets 4 disposed on one surface side thereof, and a reflection sheet 6 which is arranged on the other surface side of the light guide plate 5 to reflect the light made incident on the light guide plate 5 from the light source 3 to the optical sheets 4.

In such a conventional liquid crystal display apparatus, as described above, when the reflection sheet 6 sags toward the light source 3 side at the central part thereof due to its own weight, and the light source 3 partially approaches the light guide plate 5 side, the distal end surface of the reflection sheet 6 protruding to the light source 3 side comes into contact with the light source 3, to thus be bent, as illustrated in FIGS. 14 and 15. In such a case, at such place in relation with the light guide plate 5, incidence of light from the other surface of the light guide plate 5 and leakage of light from the other surface may occur, thereby causing a problem of irradiating in yellow.

However, the backlight unit of the Japanese Patent Application Laid-open No. 2007-265882 cannot solve the above-described problems.

In consideration of the above-mentioned circumstances, it is an object of the present invention to provide a reflection sheet which reflects light made incident through a side surface of a light guide plate therein to a side of one surface of the light guide plate and is oppositely disposed to the other surface of the light guide plate, wherein the reflection sheet is provided with a cutout part at a central part of one edge thereof, and the reflection sheet is arranged so that the one edge thereof is disposed on the one side surface side of the light guide plate, thereby, when light sources, and the like are disposed on the one side surface side of the light guide plate, it is possible to prevent the reflection sheet from coming into contact with the light sources, and the like at the central part of the one edge thereof, and a light source device and a display apparatus including the same.

In addition, another object of the present invention is to provide a reflection sheet which reflects light made incident through a side surface of a light guide plate therein to a side of one surface of the light guide plate and is oppositely disposed to the other surface of the light guide plate, wherein the reflection sheet includes a plurality of reflection sheet pieces, in which one reflection sheet piece disposed on the one side surface side of the light guide plate is provided with a cutout part at a central part of one edge thereof, and the one reflection sheet piece is configured so that the one edge thereof is disposed on one side surface side of the light guide plate, thereby, when light sources, and the like are disposed on the one side surface side of the light guide plate, it is possible to prevent the reflection sheet from coming into contact with the light sources, and the like at the central part of the one edge of the reflection sheet (one reflection sheet piece), and a light source device and a display apparatus including the same.

According to one aspect of the present invention, there is provided a reflection sheet which reflects light made incident through a side surface of a light guide plate therein to a side of one surface of the light guide plate and is oppositely disposed to the other surface of the light guide plate, including: a cutout part provided at a central part of one edge thereof which is disposed on one side surface side of the light guide plate.

According to the present invention, the reflection sheet is provided with the cutout part at the central part of the one edge thereof, and when the reflection sheet is oppositely disposed to the other surface of the light guide plate, the one edge of the reflection sheet is disposed on the one side surface side of the light guide plate. Thereby, when light sources, and the like are disposed on the one side surface side of the light guide plate, even if the central part of the reflection sheet sags due to its own weight, it is possible to prevent the reflection sheet from coming into contact with the light sources at the central part of the one edge thereof.

According to another aspect of the present invention, there is provided a reflection sheet which reflects light made incident through a side surface of a light guide plate therein to a side of one surface of the light guide plate and is oppositely disposed to the other surface of the light guide plate, including: a plurality of reflection sheet pieces including one reflection sheet piece which is disposed on one side surface side of the light guide plate, wherein the one reflection sheet piece may have one edge corresponding to the one side surface of the light guide plate, and the one edge may be provided with a cutout part on a central part thereof.

According to the present invention, in the reflection sheet including the plurality of reflection sheet pieces, the one reflection sheet piece is provided with the cutout part at the central part of the one edge thereof, and when the reflection sheet is oppositely disposed to the other surface of the light guide plate, the one edge of the one reflection sheet piece is disposed on the one side surface side of the light guide plate. Thereby, when light sources, and the like are disposed on the one side surface side of the light guide plate, even if the central part of the reflection sheet sags due to its own weight, it is possible to prevent the reflection sheet (one reflection sheet piece) from coming into contact with the light sources at the central part of the one edge thereof.

In the reflection sheet according to the present invention, the cutout part may be formed in a strip shape whose length direction is along the one edge.

According to the present invention, the cutout part formed in a strip shape is provided at the central part of the one edge, so that the length direction thereof is along the one edge.

In the reflection sheet according to the present invention, the cutout part may be formed in an arc shape.

According to the present invention, the cutout part formed in an arc shape is provided at the central part of the one edge, so that a chord thereof is along the one edge.

In the reflection sheet according to the present invention, the cutout part may have a maximum depth of 2 to 3 mm from the one edge to the other edge facing the one edge.

According to the present invention, the cutout part formed in a strip shape or an arc shape is provided at the central part of the one edge, so that a maximum depth from the one edge to the other edge facing the one edge becomes 2 to 3 mm.

According to another aspect of the present invention, there is provided a light source device including: a light source; a light guide plate which emits light made incident on one side surface from the light source through one surface thereof; and the reflection sheet according to any one of the above-described inventions, wherein both ends of the one edge of the reflection sheet may be configured to protrude to the light source side from the one side surface of the light guide plate.

According to the present invention, for example, the cutout part formed in a strip shape or an arc shape is provided at the central part of the one edge of the reflection sheet, and both ends of the one edge of the reflection sheet are configured to protrude to the light source side from the one side surface of the light guide plate. Thereby, even when the central part of the reflection sheet sags due to its own weight, it is possible to prevent the reflection sheet from coming into contact with the light sources at the central part of the one edge thereof, and prevent incidence of light and leakage of the light from the other surface of the light guide plate at the both ends of the one edge of the reflection sheet without sagging as described above.

In the light source device according to the present invention, a light emitting surface of the light source and the one side surface of the light guide plate have the same dimensions as each other in a thickness direction of the light guide plate, and in at least a central part of the one side surface of the light guide plate, the light emitting surface of the light source and the one side surface of the light guide plate are disposed so as to opposite and match with each other.

According to the present invention, the light emitting surface of the light source and the one side surface of the light guide plate have the same dimensions as each other in the thickness direction of the light guide plate. Therefore, in at least the central part of the one side surface of the light guide plate, the light emitting surface of the light source and the one side surface of the light guide plate are disposed so as to opposite and match with each other, thereby in the central part of the light guide plate, the light made incident thereon is propagated therethrough while being totally reflected, and light leakage through the cutout part of the reflection sheet is prevented.

According to another aspect of the present invention, there is provided a display apparatus including: the light source device according to any one of the above-described inventions; and a display panel which is provided on the one surface side of the light guide plate of the light source device, and displays an image using light made incident thereon through the light guide plate.

According to the present invention, the light, which is made incident on the light guide plate of the light source device from the light source of the light source device and is reflected to the one surface of the light guide plate by the reflection sheet of the light source device, is emitted to the display panel through the one surface of the light guide plate. The display panel displays an image using the light.

According to the present invention, by providing the cutout part at the central part of the one edge of the reflection sheet, and arranging the reflection sheet so that the one edge thereof is disposed on the one side surface side of the light guide plate, when the light sources, and the like are disposed on the one side surface side of the light guide plate, even if the central part of the reflection sheet sags due to its own weight, it is possible to prevent the reflection sheet from coming into contact with the light sources, and the like at the central part of the one edge thereof.

According to the present invention, in the reflection sheet including the plurality of reflection sheet pieces, by providing the cutout part at the central part of the one edge of the one reflection sheet piece disposed on one side surface side of the light guide plate, and disposing the one edge of the one reflection sheet piece on the one side surface side of the light guide plate, when the light sources, and the like are disposed on the one side surface side of the light guide plate, even if the central part of the reflection sheet sags due to its own weight, it is possible to prevent the reflection sheet (one reflection sheet piece) from coming into contact with the light sources, and the like at the central part of the one edge thereof.

The above and further objects and features will move fully be apparent from the following detailed description with accompanying drawings.

DETAILED DESCRIPTION

Hereinafter, the case in which a reflection sheet, the light source device and the display apparatus according to embodiments of the present invention are applied to a television receiving apparatus including a so-called liquid crystal display panel will be described in detail, by way of an example, with reference to the accompanying drawings.

Embodiment 1

Figure 1:
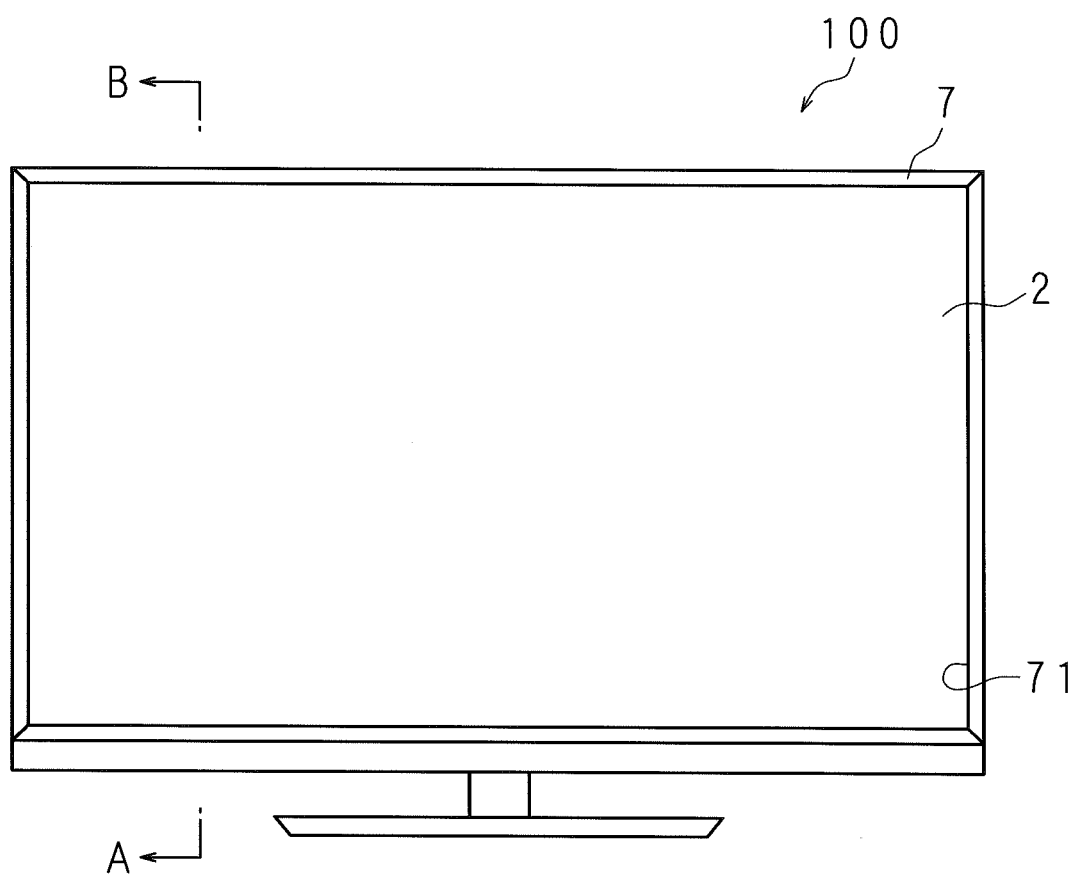
FIG. 1 is a front view illustrating an appearance of a television receiving apparatus according to Embodiment 1 of the present invention.

FIG. 1 is a front view illustrating an appearance of a television receiving apparatus according to Embodiment 1 of the present invention. In FIG. 1, a television receiving apparatus 100 according to Embodiment 1 of the present invention is illustrated. The television receiving apparatus 100 according to Embodiment 1 of the present invention is a 70 inch television receiving apparatus, for example. Hereinafter, for the convenience of explanation, a horizontal direction and a vertical direction of the television receiving apparatus are referred to as a lateral direction and a longitudinal direction, respectively.

Figure 2:
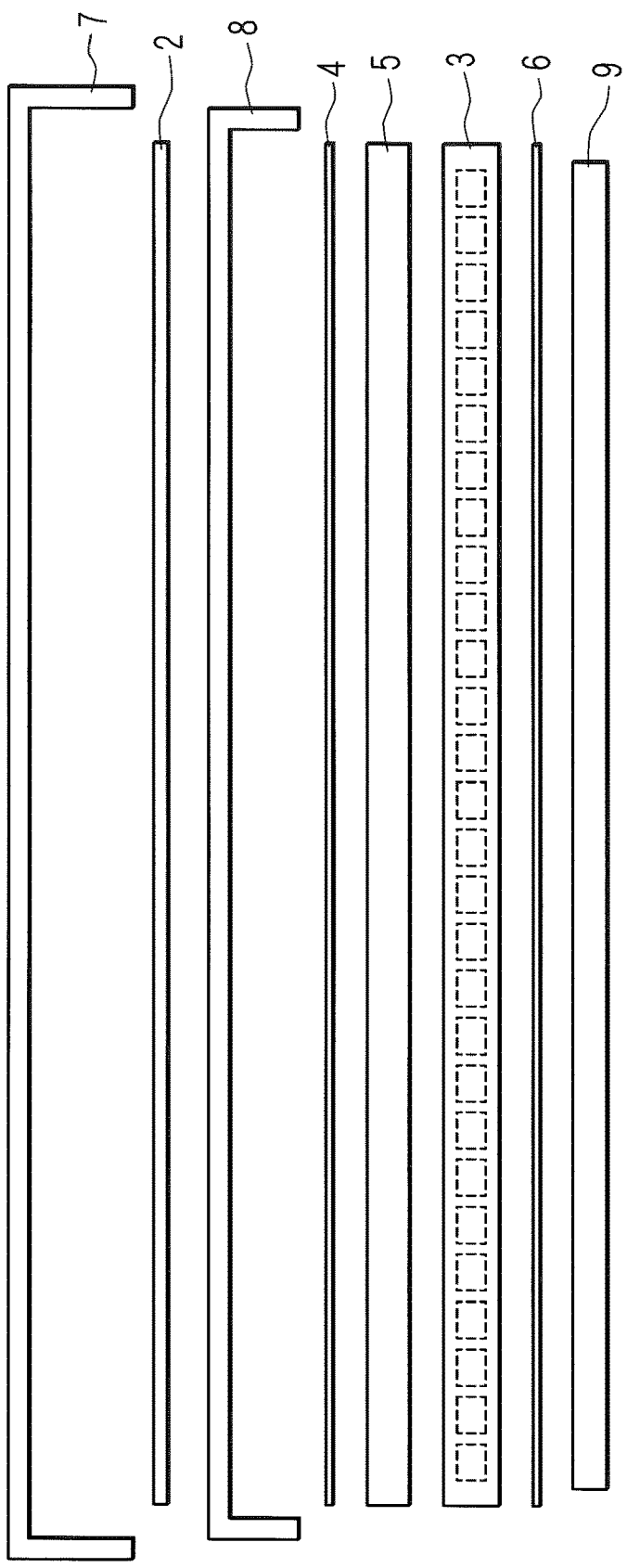
FIG. 2 is an exploded view conceptually describing main components of the television receiving apparatus according to Embodiment 1 of the present invention.
Figure 3:
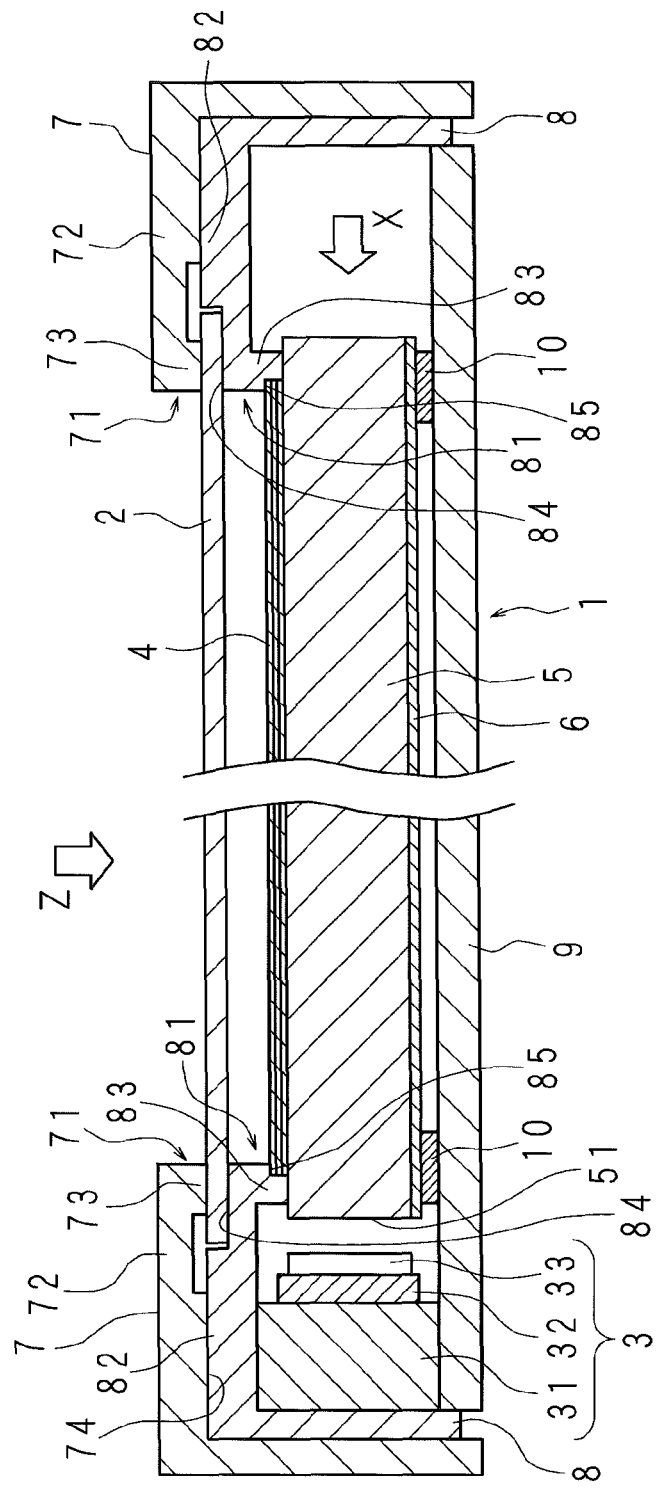
FIG. 3 is a transverse cross-sectional view taken on line A-B of FIG. 1.

FIG. 2 is an exploded view conceptually describing main components of the television receiving apparatus 100 according to Embodiment 1 of the present invention, and FIG. 3 is a transverse cross-sectional view taken along line A-B of FIG. 1. The television receiving apparatus 100 according to Embodiment 1 of the present invention, as illustrated in FIG. 1, includes a rectangular liquid crystal display panel 2 displaying an image on one surface of a front side. In addition, a light source device 1 according to the present invention is disposed on a rear side of the liquid crystal display panel 2.

The light source device 1 includes a light source unit 3, an optical sheet 4, a light guide plate 5 and a reflection sheet 6.

The optical sheet 4 is disposed so that one surface thereof faces the other surface of the liquid crystal display panel 2, the light guide plate 5 is disposed so that one surface thereof faces the other surface of the optical sheet 4, and the reflection sheet 6 is disposed so that one surface thereof faces the other surface of the light guide plate 5.

A front cover 7 is disposed on the front side from the liquid crystal display panel 2. The front cover 7 is formed in a cylindrical shape having a rectangular bottom copying the shape of one surface of the liquid crystal display panel 2 viewed from a user, and is formed in an L shape in a cross-sectional view. In addition, the front cover 7 has a rectangular display window 71 opened in the bottom thereof. The user may view an image displayed on the one surface of the liquid crystal display panel 2 through the display window 71.

Further, portions between edges of the bottom of the front cover 7 and edges of the display window 71 have a prescribed width. In other words, in the bottom of the front cover 7, residual portions other than the display window 71 are formed as hollow rectangular frame parts 72. Peripheral edge parts of the one surface of the liquid crystal display panel 2 are covered with the frame parts 72.

The frame parts 72 are provided with panel holding parts 73 which protrude in a thickness direction of the liquid crystal display panel 2 on a rear side thereof along the edge of the display window 71 side, and abut the peripheral edge parts of the liquid crystal display panel 2 to push down the same. That is, the panel holding parts 73 hold the liquid crystal display panel 2 by pressing the peripheral edge parts of the liquid crystal display panel 2 to a P chassis 8 to be described below.

In addition, the liquid crystal display panel 2 is provided with a polarizing plate (not illustrated) on the other surface thereof, and is configured in such a manner that light made incident thereon by using the polarizing plate is separated into p-waves (horizontal polarizing component) and s-waves (vertical polarizing component), then only the p-waves are transmitted toward the one surface, and the s-waves are absorbed by the polarizing plate. The liquid crystal display panel 2 may be an electrophoresis liquid crystal panel, for example.

In addition, the frame parts 72 are provided with abutting surfaces 74 which are formed with a prescribed step difference on a rear side thereof and a side opposite to the panel holding parts 73, so as to abut the P chassis 8. The liquid crystal display panel 2, the P chassis 8, and the light source device 1 are housed in the front cover 7.

The P chassis 8 is provided on the other surface side of the liquid crystal display panel 2, which abut the peripheral edge parts of the other surface of the liquid crystal display panel 2 to support the liquid crystal display panel 2. As described above, the panel holding parts 73 press the peripheral edge parts of the liquid crystal display panel 2 to the P chassis 8 side, and the liquid crystal display panel 2 is pinched by the panel holding parts 73 and the P chassis 8.

In addition, the P chassis 8 are formed in a cylindrical shape having a rectangular bottom copying the shape of the bottom of the front cover 7, and are formed in an L shape in a cross-sectional view. Further, the P chassis 8 has a rectangular opening 81 formed in the bottom thereof copying the display window 71.

In the bottom of the P chassis 8, residual portions other than the opening 81 are formed as abutting parts 82 which abut the other surface of the liquid crystal display panel 2 and the abutting surfaces 74 of the front cover 7, and the abutting parts 82 are formed in a hollow rectangular shape. The light source device 1 is housed in the P chassis 8.

One end parts of the abutting parts 82 on the opening 81 side have cutout parts 84 formed in a shape copying the peripheral edge parts of the other surface of the liquid crystal display panel 2, and the peripheral edge parts of the other surface of the liquid crystal display panel 2 abut the cutout parts 84.

In addition, the one end parts of the abutting parts 82 are provided with sheet holding parts 83 which protrude in a thickness direction of the optical sheet 4 on a rear side of the one end part thereof, and abut the peripheral edge parts of the optical sheet 4 to push down the same to hold the optical sheet 4, the light guide plate 5 and the reflection sheet 6. end parts of the sheet holding parts 83 have cutout parts 85 formed in a shape copying the peripheral edge parts of the one surface of the optical sheet 4, and the peripheral edge parts of the one surface of the optical sheet 4 abut the cutout parts 85. Thereby, the sheet holding parts 83 holds the optical sheet 4, the light guide plate 5 and the reflection sheet 6 by pressing the peripheral edge parts of the optical sheet 4 to a spacer 10 to be described below.

The optical sheet 4 is a publicly known sheet which functions to diffuse and collect, etc. light emitted from the light source unit 3 and made incident thereon through the light guide plate 5, so as to more uniformly emit light toward the liquid crystal display panel 2. For example, the optical sheet 4 includes two diffusion sheets, and one prism sheet, wherein the prism sheet is installed between the two diffusion sheets.

One diffusion sheet of the two diffusion sheets, which is disposed on the light guide plate 5 side, is an optical sheet which functions to diffuse light made incident thereon from the light source unit 3 through the light guide plate 5 and allow it to be made incident on the prism sheet. In addition, the prism sheet is an optical sheet which functions to collect the light made incident thereon through the one diffusion sheet and emit it toward the other diffusion sheet. The light passing through the prism sheet is made incident on the other diffusion sheet perpendicular to the prism sheet.

The other diffusion sheet disposed on the liquid crystal display panel 2 side is an optical sheet which functions to again diffuse the light made incident thereon through the prism sheet and emit it toward the liquid crystal display panel 2 with a more uniform luminance distribution.

The rectangular light guide plate 5 is disposed on the other side of the optical sheet 4. The light guide plate 5 guides light emitted by the light source unit 3 to the optical sheet 4 (liquid crystal display panel 2). For example, the light guide plate 5 may be configured in such a manner that the one surface thereof facing the other surface of the optical sheet 4 has an emitting surface on which a pattern is formed so that the light made incident thereon from the light source unit 3 advances in the liquid crystal display panel 2 direction. Thereby, the light guide plate 5 may convert the light made incident thereon from the light source unit 3 into flat light to uniformly transmit it to the optical sheet 4 through the emitting surface. Further, the light guide plate 5 may have notch parts corresponding to a so-called positioning pin or hole formed at an edge part thereof, however in this case, the light guide plate 5 is formed in a substantially rectangular shape as a whole.

In addition, the light guide plate 5 is formed with a high transparency acrylic resin, for example. The reflection sheet 6 is disposed on the other surface of the light guide plate 5 for irregularly reflecting the light made incident thereon from the light source unit 3 and emitting it through the emitting surface of the light guide plate 5.

The light source unit 3 is provided around one side surface of the light guide plate 5 on the down side in a longitudinal direction thereof. The light source unit 3 has a strip-shaped substrate 32 oppositely disposed to one side surface 51 of the light guide plate 5, a plurality of light sources 33, 33, . . . , 33 mounted on the substrate 32 in a length direction thereof, and a square column-shaped dissipation block 31 which is arranged on the other surface side of the substrate 32 to cool heat emitted by the light sources 33, 33, . . . , 33 through the substrate 32.

The light source 33 may be, for example, a cold cathode fluorescent lamp (CCFL), external electrode fluorescent lamp (EEFL), hot cathode fluorescent lamp (HCFL), light emitting diode (LED) or the like.

The reflection sheet 6 is formed in a rectangular shape copying the light guide plate 5 and disposed so that one surface thereof faces the other surface of the light guide plate 5. The reflection sheet 6 is formed with a white resin having excellent light reflecting properties, for example, and has a function to reflect the light made incident on the light guide plate 5 from the light sources 33 and return the reflected light to the emitting surface side of the light guide plate 5. In addition, the one surface of the reflection sheet 6 may be applied with a paint having excellent light reflecting properties. Further, similar to the light guide plate 5, the reflection sheet 6 may also have notch parts corresponding to a so-called positioning pin or hole formed at the edge part thereof, however in this case, the reflection sheet is formed in a substantially rectangular shape as a whole.

Meanwhile, a dissipation material 9 is disposed on the other surface side of the reflection sheet 6 with spacers 10 and 10 interposed therebetween. The other surface of the reflection sheet 6 faces one surface of the dissipation material 9. The spacers 10 are provided on both end sides of the light guide plate 5 in the longitudinal direction.

Figure 4:
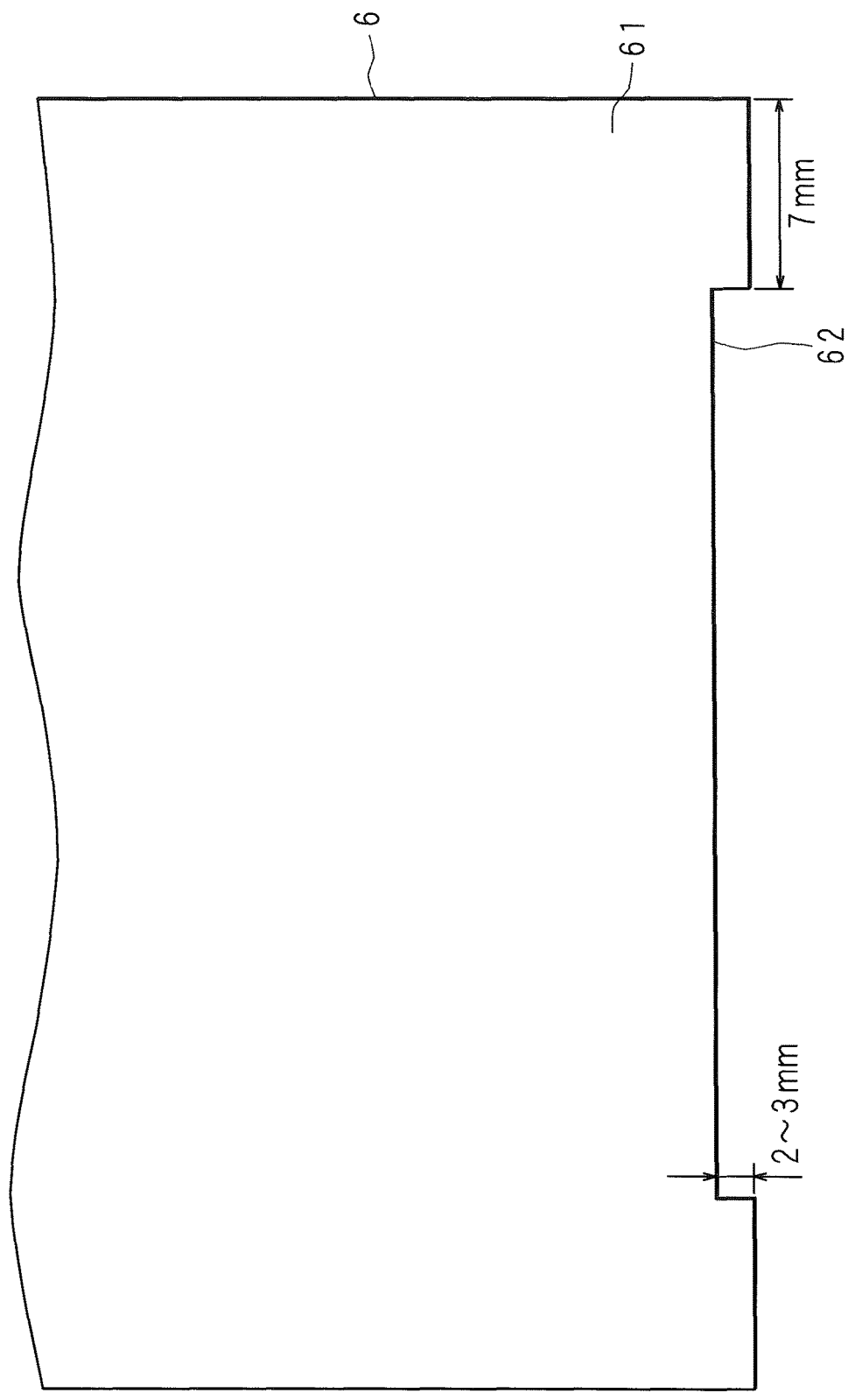
FIG. 4 is a view describing a shape of a reflection sheet of the television receiving apparatus according to Embodiment 1 of the present invention.

FIG. 4 is a view describing a shape of the reflection sheet 6 of the television receiving apparatus 100 according to Embodiment 1 of the present invention.

In the television receiving apparatus 100 according to Embodiment 1 of the present invention, the reflection sheet 6 is formed in a rectangular shape, and has a cutout part 62 formed at an end part 61 of one edge thereof on the light source unit 3 side. The cutout part 62 is formed in a strip shape whose length direction is along the one edge.

In more detail, the cutout part 62 is formed at a distance of 7 mm respectively separated from the both ends of the one edge of the reflection sheet 6, and is formed so that a depth from the one edge to the other edge facing the one edge is 2 to 3 mm.

Figure 5:
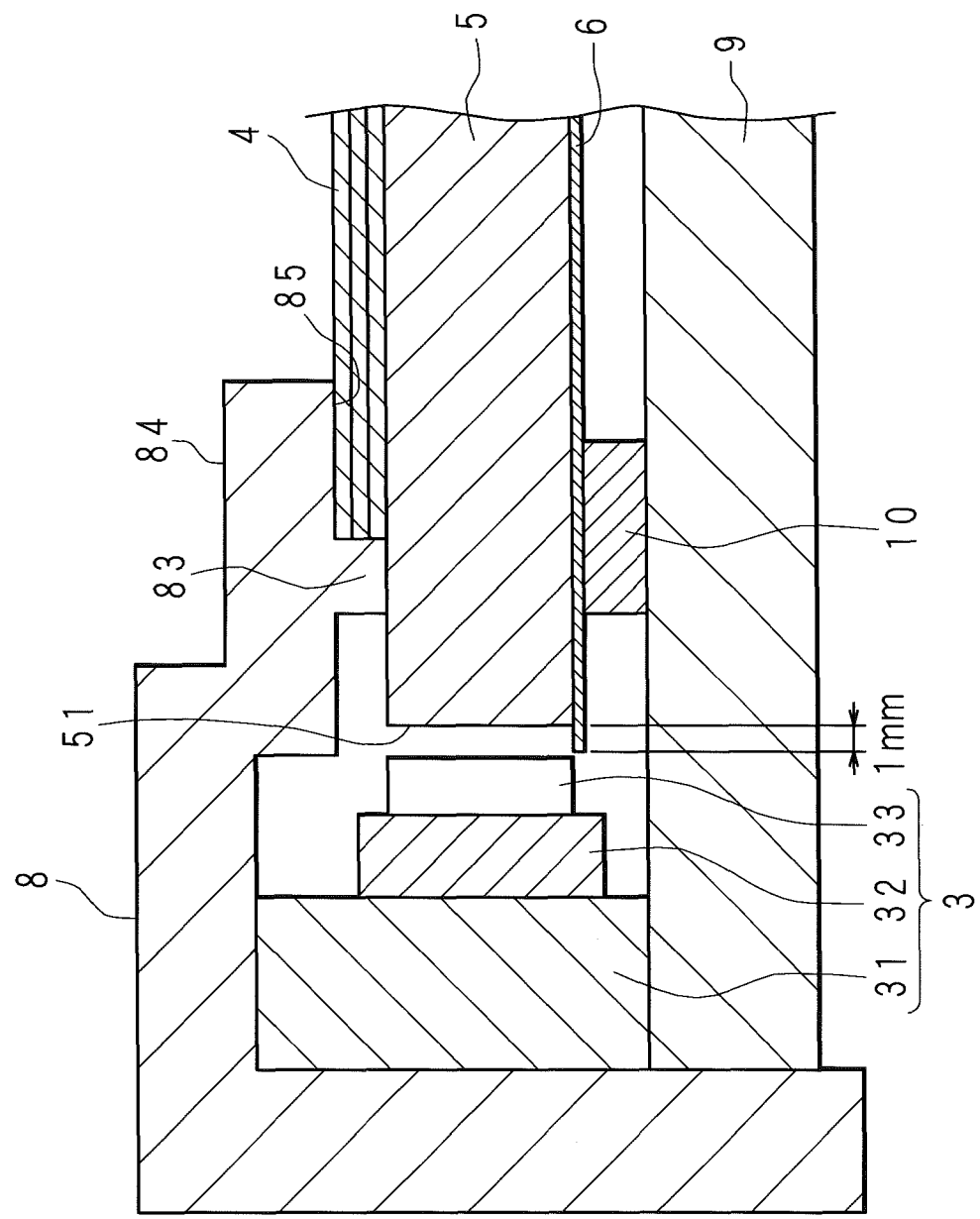
FIG. 5 is a view describing a positional relation between a light source unit and a light guide plate with a reflection sheet in the vicinity of an end part and a central part of the light source unit, in the television receiving apparatus according to Embodiment 1 of the present invention.
Figure 6:
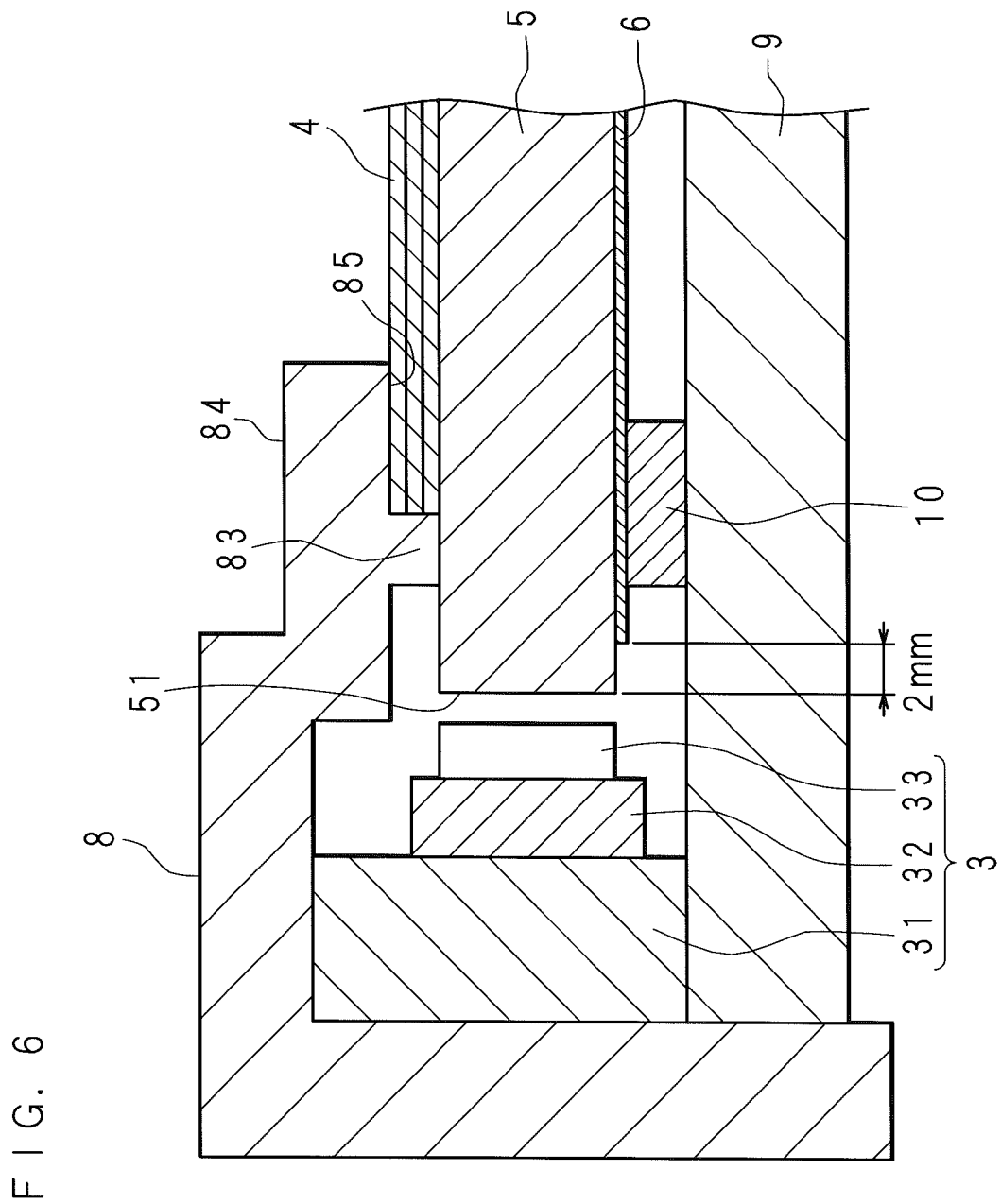
FIG. 6 is a view describing the positional relation between the light source unit and the light guide plate with the reflection sheet in the vicinity of the end part and the central part of the light source unit, in the television receiving apparatus according to Embodiment 1 of the present invention.

FIGS. 5 and 6 are views describing a positional relation between the light source unit 3 and the light guide plate 5 with the reflection sheet 6 in the vicinity of the end part and a central part of the light source unit 3, in the television receiving apparatus 100 according to Embodiment 1 of the present invention. FIG. 5 is a view describing the positional relation between the light source unit 3 and the light guide plate 5 with the reflection sheet 6 in the vicinity of the one end part of the light source unit 3, and FIG. 6 is a view describing the positional relation between the light source unit 3 and the light guide plate 5 with the reflection sheet 6 in the vicinity of the central part of the light source unit 3.

As illustrated in FIG. 5, in the vicinity of the one end part of the light source unit 3, the reflection sheet 6 is configured in such a manner that an end surface of the end part 61 of the one edge thereof does not abut the light sources 33, 33, . . . , 33, while protruding 1 mm to the light source unit 3 side from the one side surface 51 of the light guide plate 5.

In addition, as illustrated in FIG. 6, in the vicinity of the central part of the light source unit 3, since the cutout part 62 is formed in the reflection sheet 6, the reflection sheet 6 is configured in such a manner that the end surface of the end part 61 of the one edge thereof is located at a distance of 2 mm from the one side surface 51 of the light guide plate 5 toward the other edge facing the one edge.

Meanwhile, in manufacturing of an actual television receiving apparatus, there are cases in which, due to design errors, circumstances of assembly, variations in dimensions, or the like, a problem may occur in arrangement of the light source unit 3 and the light guide plate 5. For example, there may be: a case in which the light source unit 3 is warped to the light guide plate 5 side at the central part in the length direction thereof during assembling; a case in which the light source unit 3 is disposed on the lower side of the light guide plate 5; and a case in which the reflection sheet 6 sags toward the light source unit 3 side at the central part thereof due to its own weight. Further, there may be a case in which holding conditions between the central part and the both end parts of the light guide plate 5 are different from each other in a direction along the length direction of the light source unit 3 due to design errors and the like.

Figure 7:
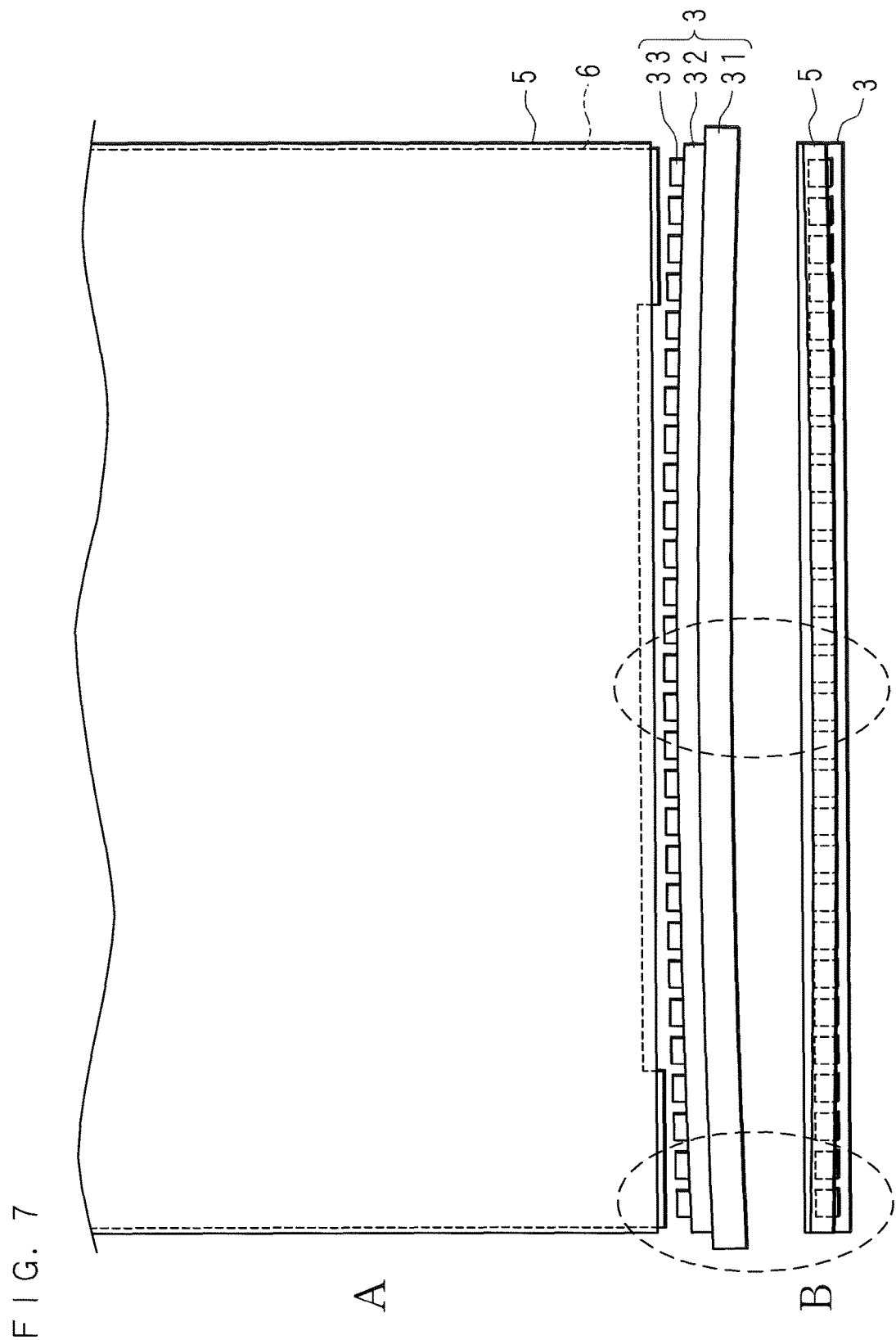
FIG. 7 is a view describing the positional relation between the light source unit and the light guide plate with the reflection sheet when a problem occurs during assembling.

FIG. 7 is a view describing the positional relation between the light source unit 3 and the light guide plate 5 with the reflection sheet 6 when a problem occurs during assembling. FIG. 7A is a view describing the problem when viewing from Z direction in FIG. 3, and FIG. 7B is a view describing the problem when viewing from X direction in FIG. 3.

As described above, when: the light source unit 3 is warped to the light guide plate 5 side at the central part in the length direction thereof; the reflection sheet 6 sags toward the light source unit 3 side at the central part thereof due to its own weight; and the holding conditions between the central part and the both end parts of the reflection sheet 6 are different from each other, problems such as the light guide plate 5 with the reflection sheet 6 and the light source unit 3 coming close to each other, as well as the positions of the light sources 33, 33, . . . , 33 and the light guide plate 5 not matching with each other may occur.

That is, since the light source unit 3 is warped to the light guide plate 5 side at the central part in the length direction thereof, as well as the reflection sheet 6 sags toward the light source unit 3 side at the central part thereof due to its own weight, problems such as the light guide plate 5 with the reflection sheet 6 and the light source unit 3 coming close to each other, and the end part 61 of the reflection sheet 6 protruding to the light source unit 3 side from the light guide plate 5 abutting the light sources 33, 33, . . . , 33 so as to be deformed, and thereby light having a changed color (for example, yellow color) is emitted from the light guide plate 5 may occur.

Further, as illustrated in FIG. 7B, in the case in which the light guide plate 5 has different holding conditions between the central part and the both end parts thereof and is held in a state of being bent toward the liquid crystal display panel 2 side at the end part of the light guide plate 5, a problem that a light emitting surface 331 described below of the light sources 33, 33, . . . , 33 does not match with the one side surface 51 of the light guide plate 5 on the light sources 33, 33, . . . , 33 side on which the light is made incident in facing direction where the light emitting surface 331 and the one side surface 51 are facing each other may occur.

Figure 8:
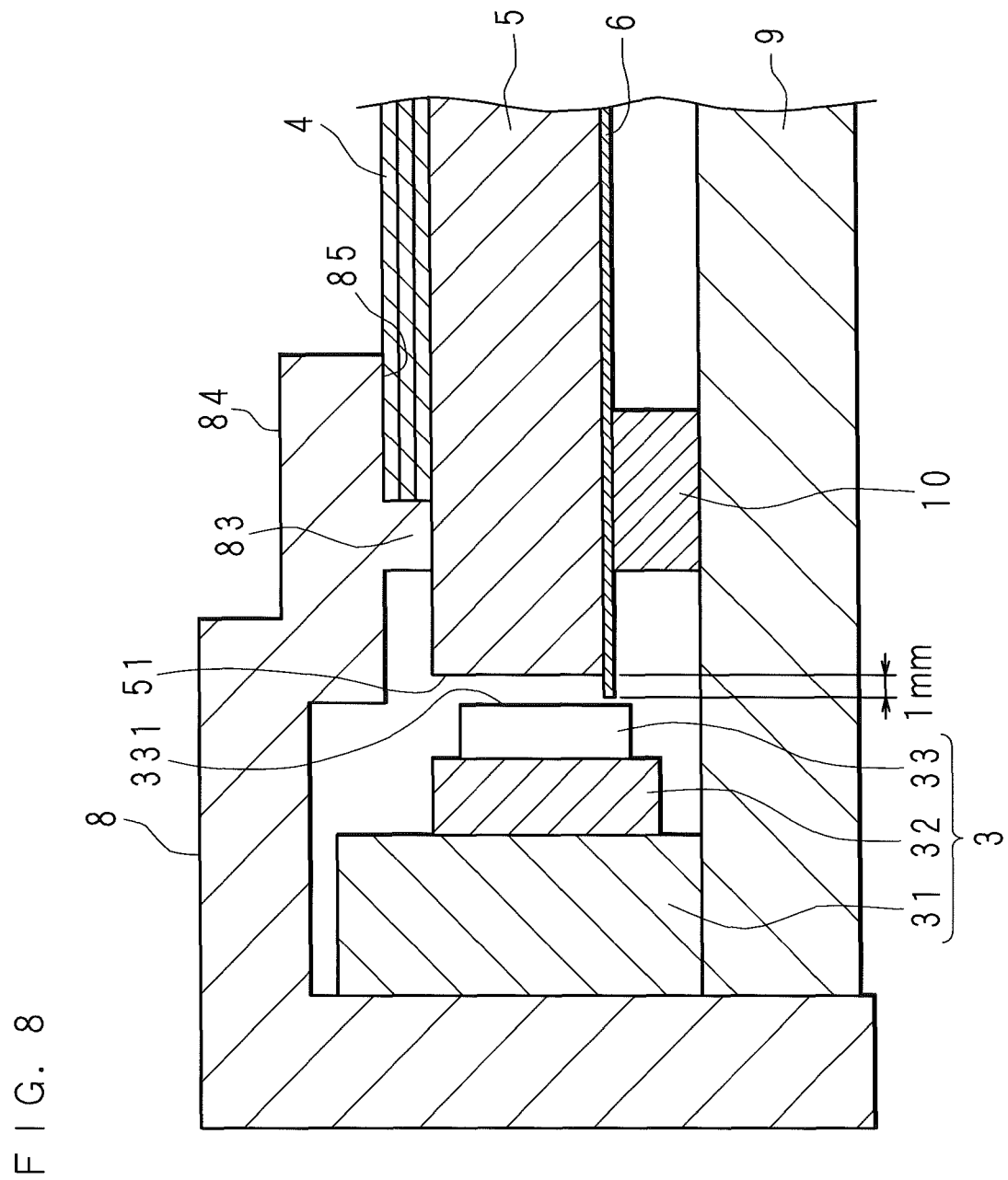
FIG. 8 is a view describing a measure for the case in which a problem occurs during assembling in the television receiving apparatus according to Embodiment 1 of the present invention.
Figure 9:
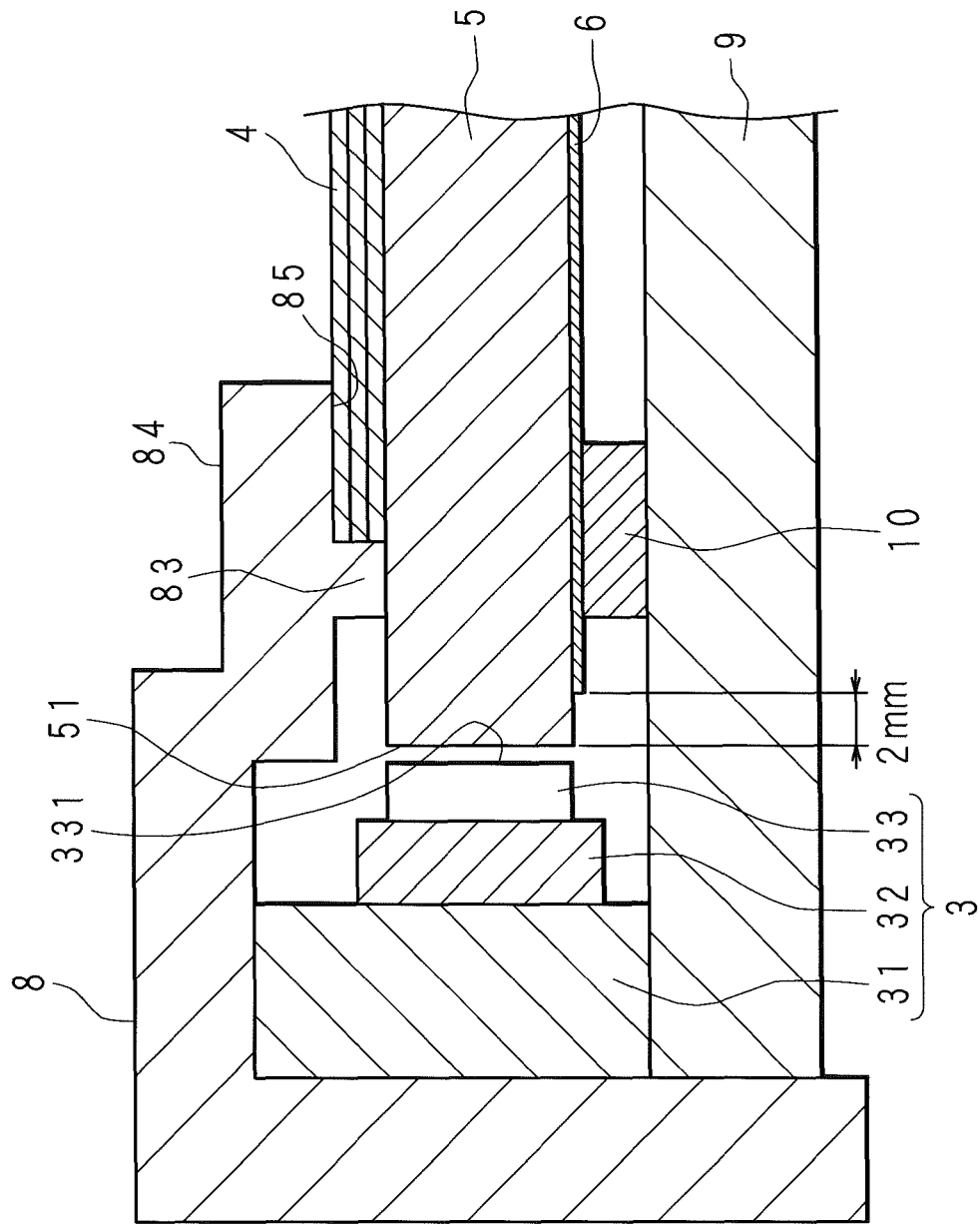
FIG. 9 is a view describing the measure for the case in which the problem occurs during assembling in the television receiving apparatus according to Embodiment 1 of the present invention.

FIGS. 8 and 9 are views describing a countermeasure for the case in which a problem occurs during assembling in the television receiving apparatus 100 according to Embodiment 1 of the present invention. FIG. 8 is a view describing the positional relation between the light source unit 3 and the light guide plate 5 with the reflection sheet 6 in the vicinity of the one end part of the light source unit 3, and FIG. 9 is a view describing the positional relation between the light source unit 3 and the light guide plate 5 with the reflection sheet 6 in the vicinity of the central part of the light source unit 3.

In the television receiving apparatus 100 according to Embodiment 1 of the present invention, as described above, since the reflection sheet 6 is configured in such a manner that, in the vicinity of the both end parts of the light source unit 3 in the length direction thereof, the end surface of the end part 61 of the one edge thereof protrudes to the light source unit 3 side from the one side surface 51 of the light guide plate 5 within a range that the end surface does not abut the light sources 33, 33, . . . , 33, it is possible to cope with the problem that, in the vicinity of the end part of the light source unit 3, the positions facing the light emitting surface 331 of the light sources 33, 33, . . . , 33 for emitting light toward the light guide plate 5 with the one side surface 51 of the light guide plate 5 do not match with each other.

That is, as illustrated in FIG. 8, in the vicinity of the one end part of the light source unit 3, the positions facing the light emitting surface 331 of the light sources 33, 33, . . . , 33 with the one side surface 51 of the light guide plate 5 do not match with each other due to a position change of the light source unit 3 to the other surface side of the light guide plate 5. However, in the vicinity of the end part of the light source unit 3, since the light guide plate 5 with the reflection sheet 6 and the light source unit 3 do not come close to each other, the end part 61 of the reflection sheet 6 protruding to the light source unit 3 side does not abut the light sources 33, 33, . . . , 33, and thereby incidence of light from the other surface and leakage of light from the other surface of the light guide plate 5 are prevented.

In the television receiving apparatus 100 according to Embodiment 1 of the present invention, by forming the cutout part 62 at the central part of the one edge of the reflection sheet 6, it is possible to cope with the problem that, in the vicinity of the central part of the light source unit 3, the light guide plate 5 with the reflection sheet 6 and the light source unit 3 come close to each other, and the end part 61 of the reflection sheet 6 protruding from the light guide plate 5 abuts the light sources 33, 33, . . . , 33 so as to be deformed.

That is, as illustrated in FIG. 9, since in the vicinity of the central part of the light source unit 3, the end surface of the end part 61 of the reflection sheet 6 is located at a distance of 2 mm from the one side surface 51 of the light guide plate 5 toward the other edge facing the one edge of the reflection sheet 6, a problem that the end surface of the end part 61 of the reflection sheet 6 abuts the light sources 33, 33, . . . , 33 so as to be deformed is prevented.

Further, the television receiving apparatus 100 according to Embodiment 1 of the present invention is configured in such a manner that, in the vicinity of the central part of the light source unit 3 or in the vicinity of the central part of the one edge of the reflection sheet 6, the light emitting surface 331 of the light sources 33, 33, . . . , 33 matches with the one side surface 51 of the light guide plate 5 in the facing direction and in the thickness direction of the light guide plate 5, the dimensions of the light emitting surface 331 of the light sources 33, 33, . . . , 33 and the one side surface 51 of the light guide plate 5 are the same as each other. Accordingly, since the light made incident on the light guide plate 5 from the one side surface 51 thereof is propagated therethrough while being totally reflected, light leakage through the other surface of the light guide plate 5 and the cutout part 62 is also prevented.

In the above description, an example of the case that, in the vicinity of the central part thereof, the end surface of the end part 61 of the one edge of the reflection sheet 6 is located at a distance of 2 mm from the one side surface 51 of the light guide plate 5 toward the other edge facing the one edge has been described, but it is not limited thereto, and may include, for example, 2 mm or less from the one side surface 51 of the light guide plate 5.

Figure 10:
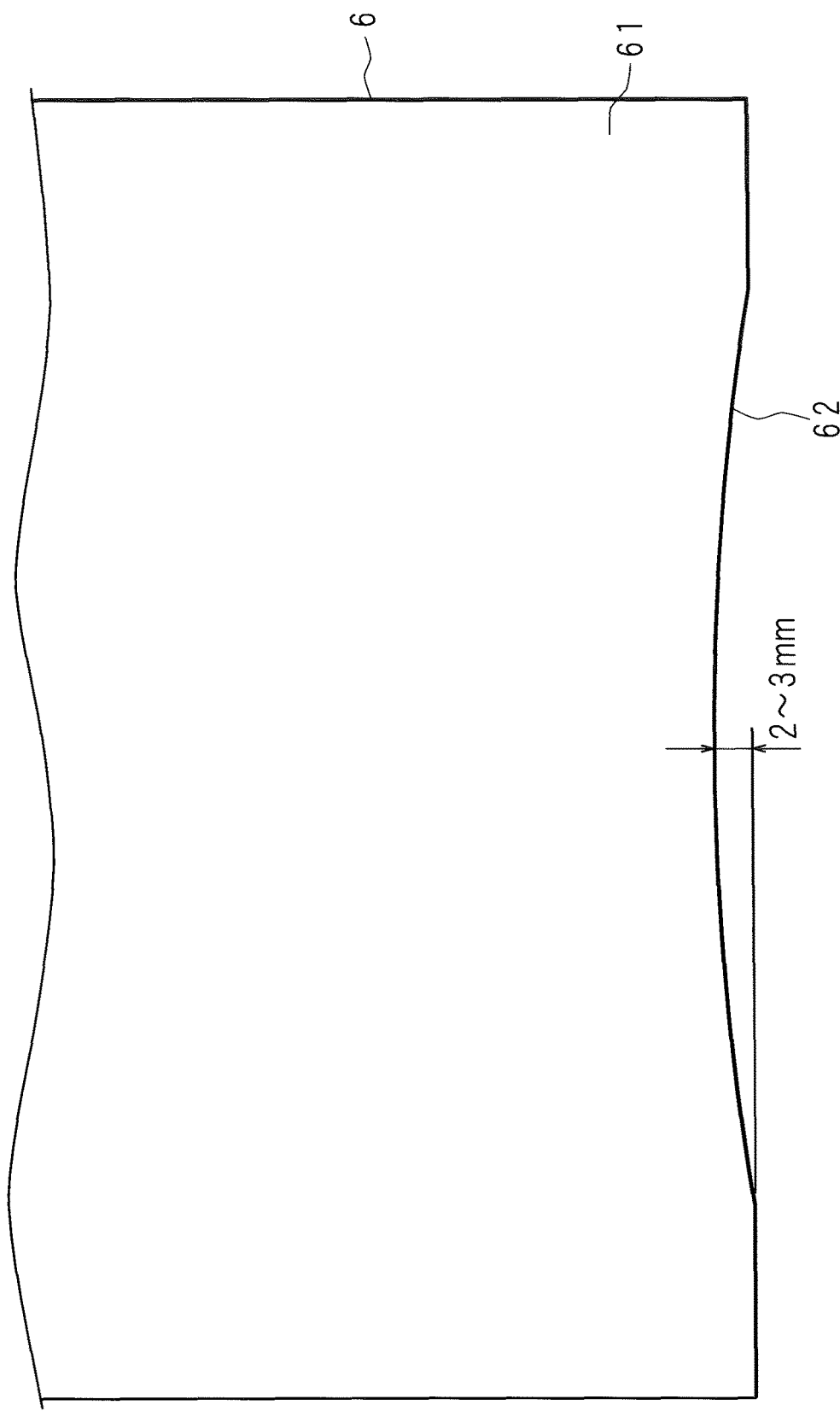
FIG. 10 is a view describing another shape of a reflection sheet of the television receiving apparatus according to Embodiment 1 of the present invention.

Further, in the above description, an example of the case that the cutout part 62 of the end part 61 is formed in a strip shape has been described, but it is not limited thereto. For example, as illustrated in FIG. 10, the cutout part may be formed in an arc shape so that a chord thereof is along the one edge of the end part 61. Furthermore, in this case, in the vicinity of the central part of the one edge of the cutout part 62 of the reflection sheet 6, the cutout part may be formed so that the end surface of the end part 61 is located at a distance of a maximum of 2 mm toward the other edge facing the one edge from the one side surface 51 of the light guide plate 5.

Embodiment 2

In a television receiving apparatus 100 according to Embodiment 2 of the present invention, a reflection sheet 6 includes a first reflection sheet piece 6A (one reflection sheet piece) and a second reflection sheet piece 6B, as described below.

Figure 11:
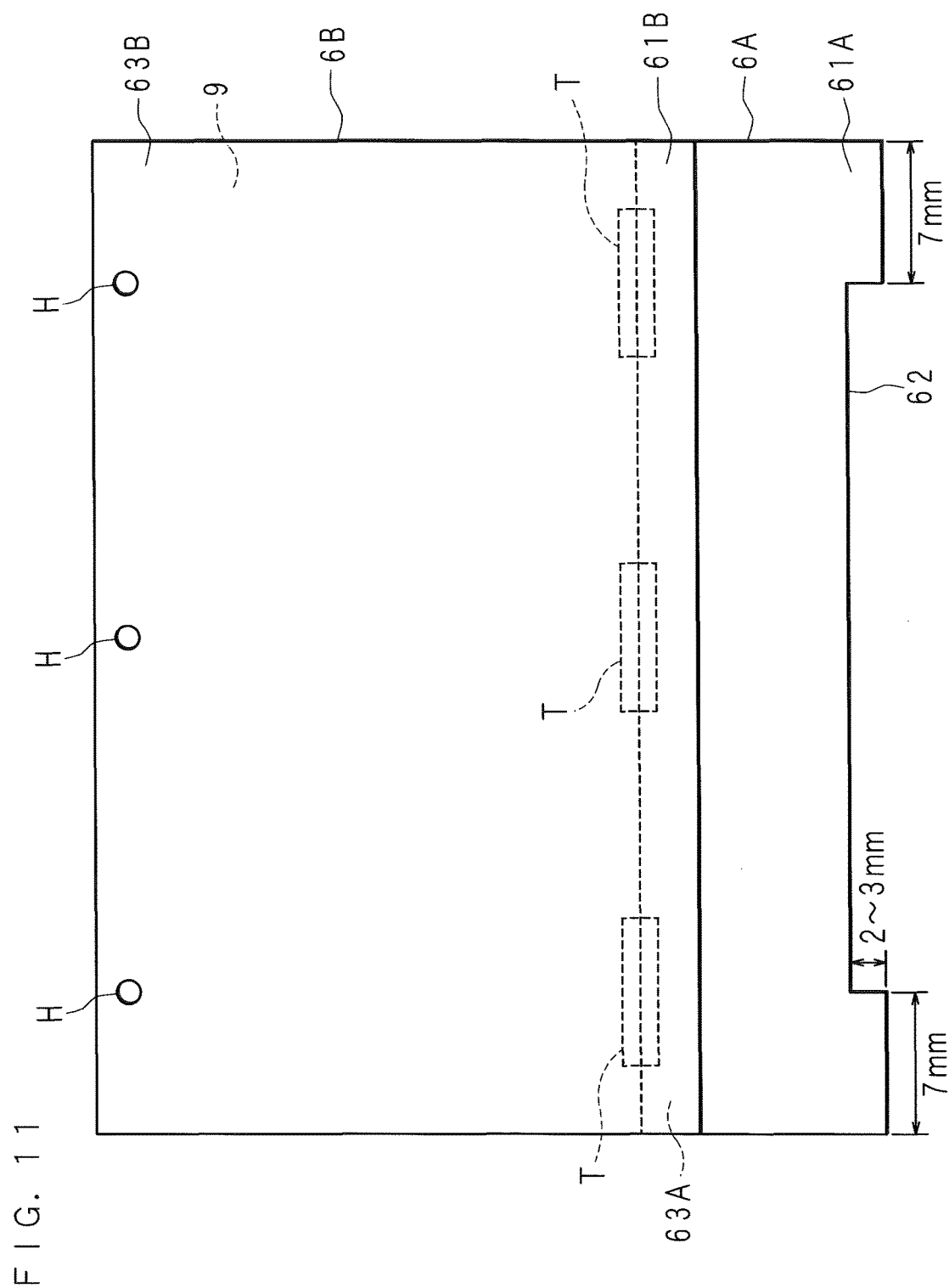
FIG. 11 is a view describing a shape of a reflection sheet of a television receiving apparatus according to Embodiment 2 of the present invention.

FIG. 11 is a view describing a shape of a reflection sheet of the television receiving apparatus 100 according to Embodiment 2 of the present invention. The first reflection sheet piece 6A is formed in a strip shape, and is disposed in such a manner that the length direction thereof is parallel to a juxtaposed direction of the light sources 33, 33, . . . , 33, in other words, the length direction thereof is set as the lateral direction. In the first reflection sheet piece 6A, an end part 61A of one edge (lower side) in a width direction is disposed in the vicinity of the light sources 33, 33, . . . , 33, and an end part 63A of the other edge (upper side) in the width direction is fixed to the dissipation material 9 by tapes T, T and T. In this regard, as described above, the end part 61A of the one edge of the first reflection sheet piece 6A in the width direction thereof is sandwiched between the sheet holding part 83 and the spacer 10.

The first reflection sheet piece 6A has a cutout part 62 formed at the end part 61A of the one edge thereof. The cutout part 62 is formed in a strip shape whose length direction is along the one edge, similar to the case of Embodiment 1. In more detail, the cutout part 62 is formed at a distance of 7 mm respectively separated from the both ends of the one edge of the first reflection sheet piece 6A, and is formed so that the depth from the one edge to the other edge facing the one edge is 2 to 3 mm.

Meanwhile, the second reflection sheet piece 6B is formed in a rectangular shape having a slightly wider area than the display window 71, and has a slightly wider area than the one surface corresponding to the light guide plate 5. In addition, the second reflection sheet piece 6B is configured in such a manner that dimensions of an end part 61B of one lower side in the longitudinal direction are the same as or slightly smaller than the dimensions of the first reflection sheet piece 6A in the length direction thereof. Three holes H, H and H are formed at an end part 63B of the other upper side in the lateral direction, and the second reflection sheet piece 6B is held on the dissipation material 9 by studs inserted therein, for example.

In addition, the second reflection sheet piece 6B is slidably sandwiched between the first reflection sheet piece 6A and the light guide plate 5 in a prescribed range of the end part 61B. That is, since the end part 61B of the second reflection sheet piece 6B is only sandwiched and held by the first reflection sheet piece 6A and the light guide plate 5, the second reflection sheet piece 6B may slide in a direction along a plane of the light guide plate 5 while being sandwiched therebetween. Accordingly, the second reflection sheet piece 6B may be thermally expanded without occurring wrinkle.

In the television receiving apparatus 100 according to Embodiment 2 of the present invention, since it has the above-described configuration, as described above, it is possible to cope with the problem that the light guide plate 5 with the reflection sheet 6 and the light source unit 3 come close to each other, and the end part 61A of the first reflection sheet piece 6A protruding from the light guide plate 5 abuts the light sources 33, 33, . . . , 33 so as to be deformed, and the problems that the light guide plate 5 has different holding conditions between the central part and the both end parts thereof, and the light emitting surface 331 of the light sources 33, 33, . . . , 33 does not match with the one side surface 51 of the light guide plate 5 in the facing direction (see FIG. 7B).

Figure 12:
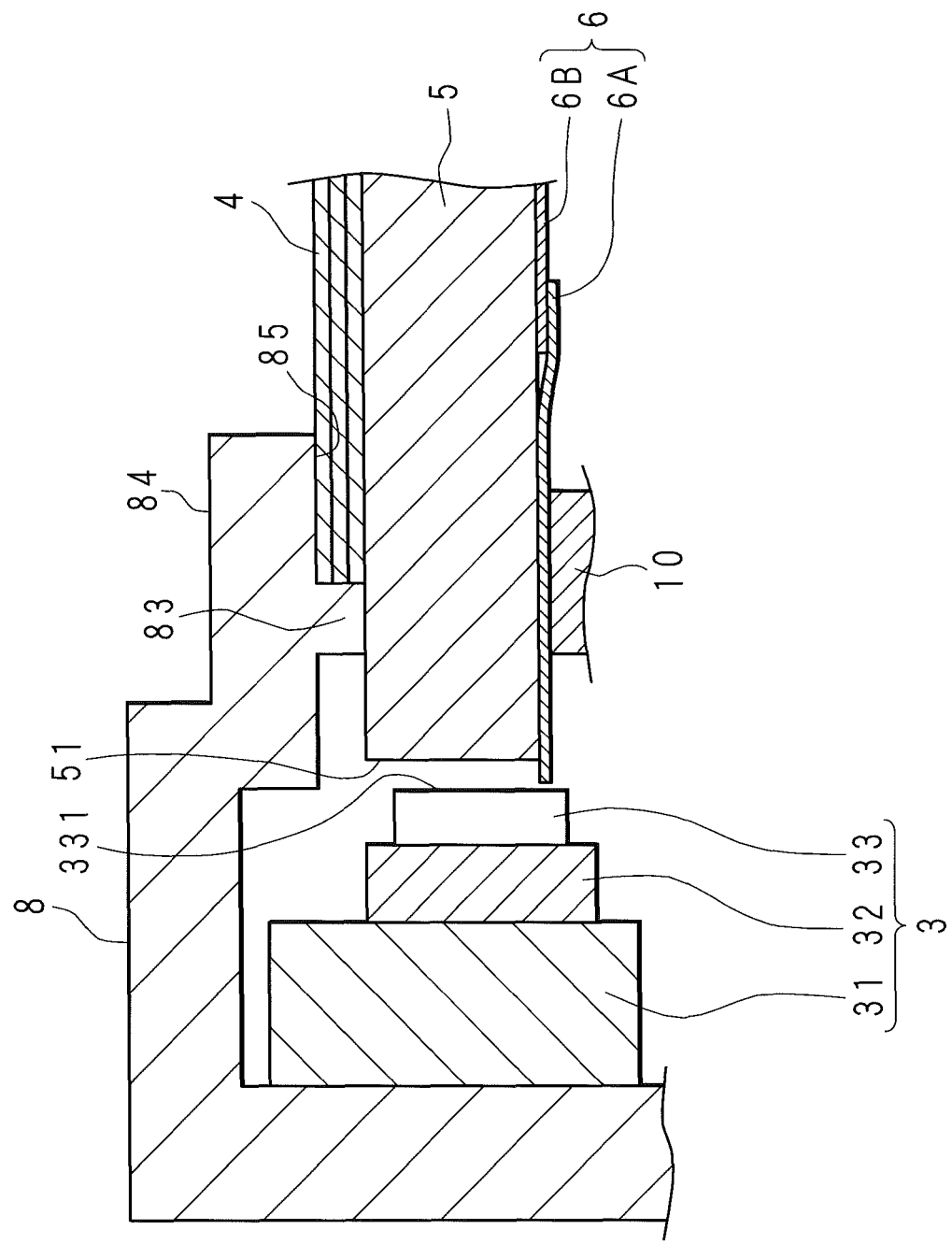
FIG. 12 is a view describing a measure for the case in which a problem occurs during assembling in the television receiving apparatus according to Embodiment 2 of the present invention.
Figure 13:
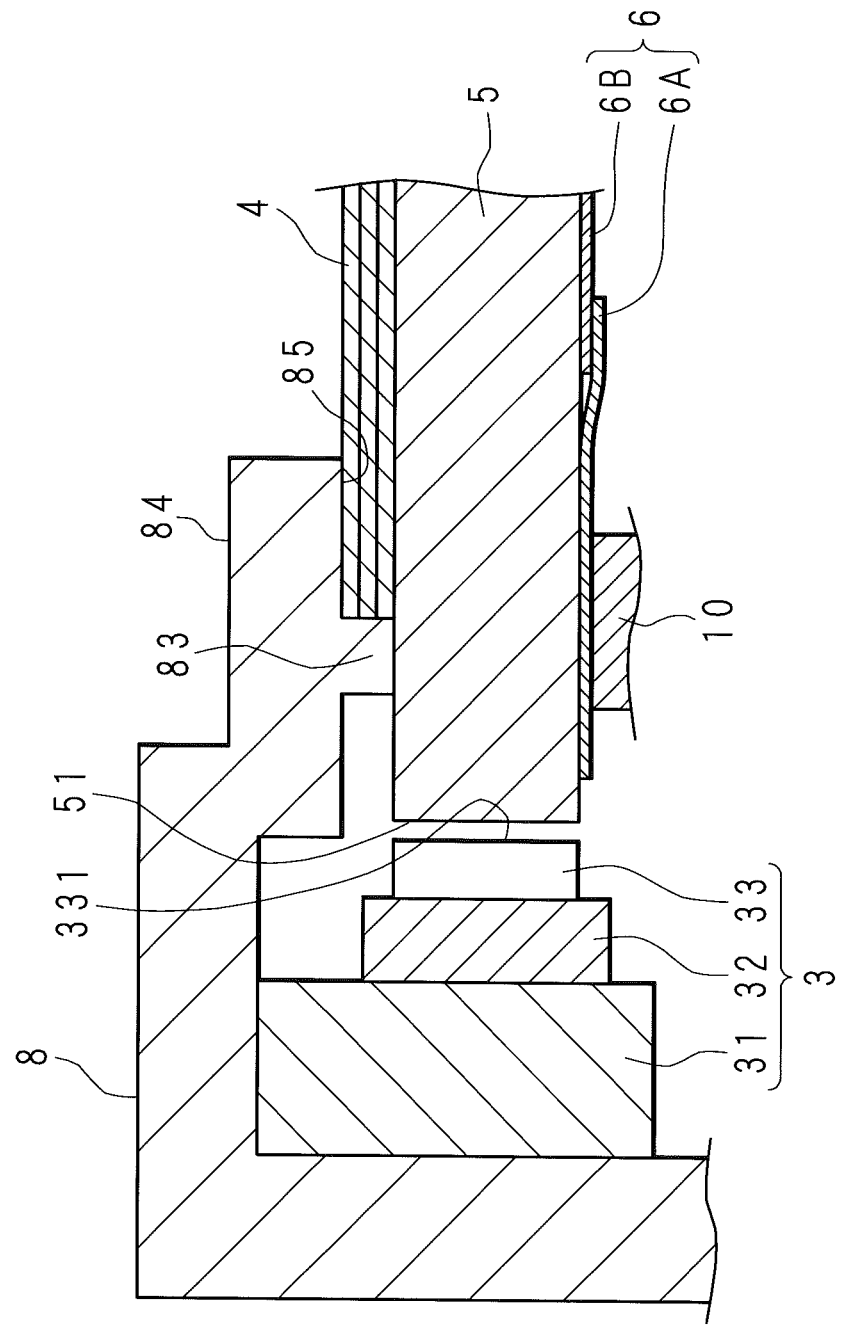
FIG. 13 is a view describing the measure for the case in which the problem occurs during assembling in the television receiving apparatus according to Embodiment 2 of the present invention.
Figure 14:
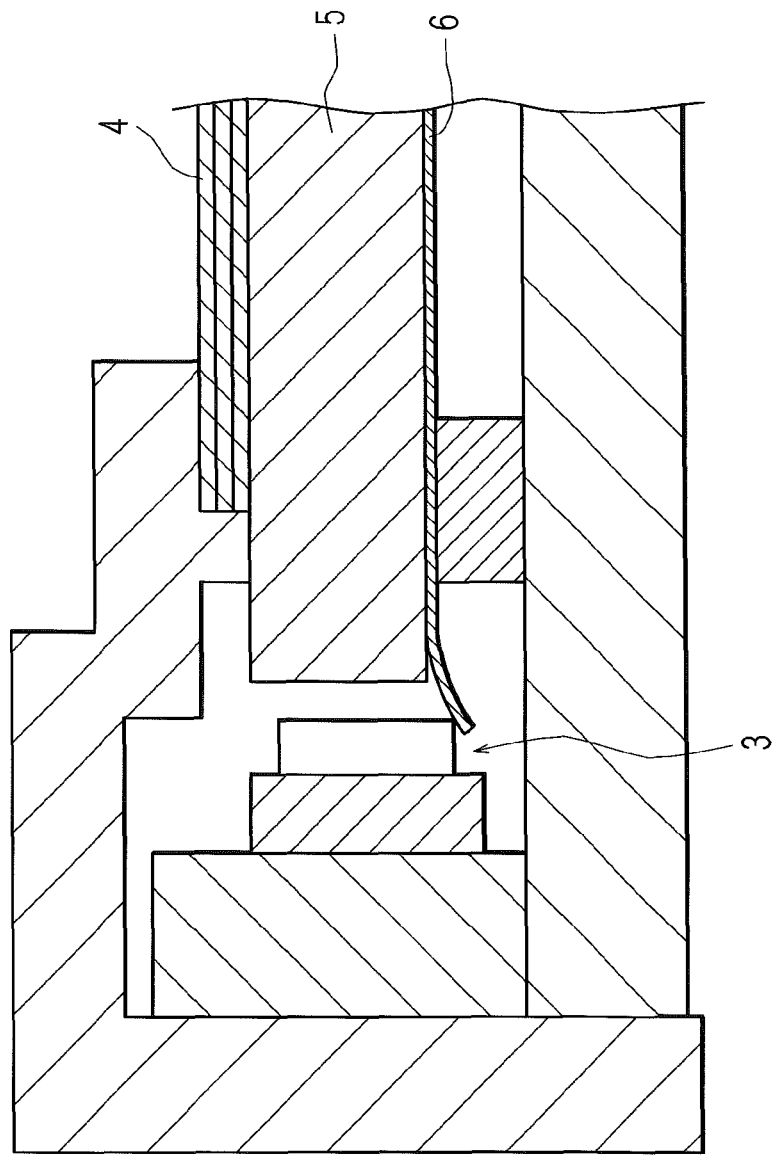
FIG. 14 is a view describing a problem occurring in a conventional liquid crystal display apparatus.
Figure 15:
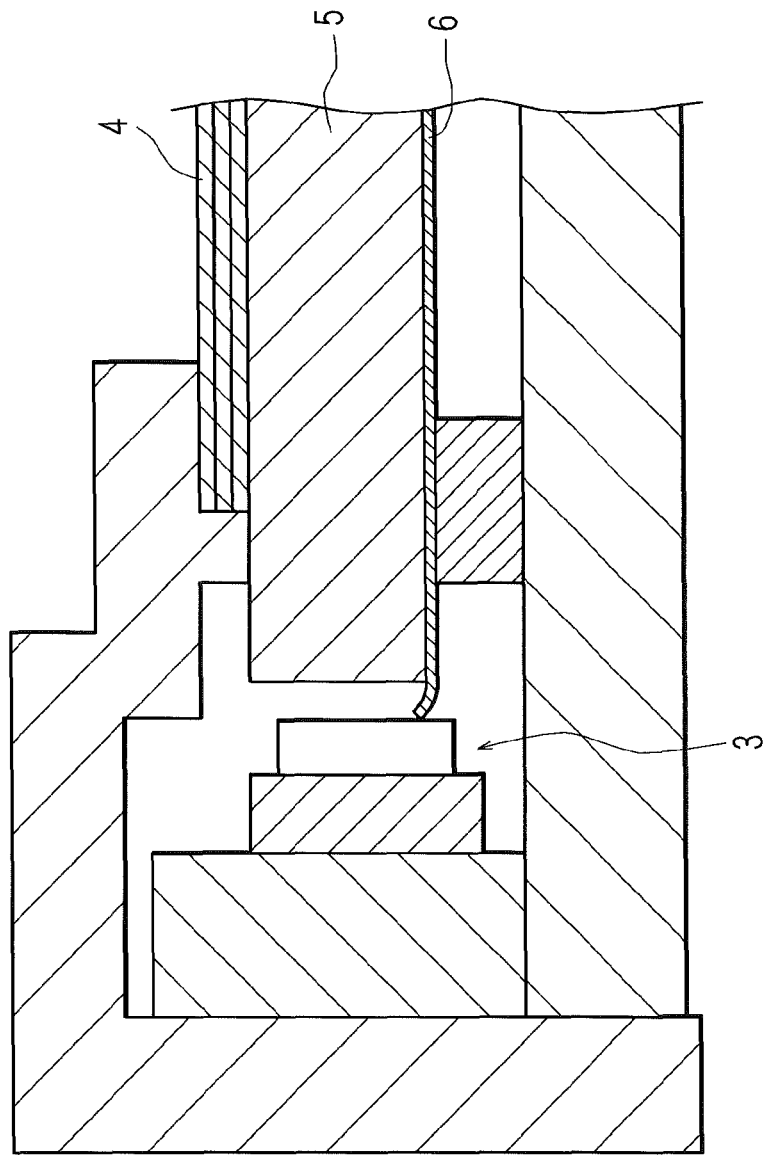
FIG. 15 is a view describing a problem occurring in the conventional liquid crystal display apparatus.

FIGS. 12 and 13 are views describing a countermeasure for the case in which a problem occurs during assembling in the television receiving apparatus 100 according to Embodiment 2 of the present invention. FIG. 12 is a view describing the positional relation between the light source unit 3 and the light guide plate 5 with the reflection sheet 6 in the vicinity of the one end part of the light source unit 3, and FIG. 13 is a view describing the positional relation between the light source unit 3 and the light guide plate 5 with the reflection sheet 6 in the vicinity of the central part of the light source unit 3.

In the television receiving apparatus 100 according to Embodiment 2 of the present invention, as described above, since the first reflection sheet piece 6A is configured in such a manner that, in the vicinity of the both end parts of the light source unit 3 in the length direction thereof, the end surface of the end part 61A of the one edge thereof protrudes to the light source unit 3 side from the one side surface 51 of the light guide plate 5 within a range that the end surface does not abut the light sources 33, 33, . . . , 33. Accordingly, in the vicinity of the both end part of the light source unit 3, even when the light emitting surface 331 of the light sources 33, 33, . . . , 33 does not match with the one side surface 51 of the light guide plate 5 in the facing direction due to a position change of the light source unit 3 to the other surface side of the light guide plate 5, in the vicinity of the end part of the light source unit 3, since the light guide plate 5 with the reflection sheet 6 and the light source unit 3 do not come close to each other, the end part 61A of the reflection sheet 6 (first reflection sheet piece 6A) protruding to the light source unit 3 side does not abut the light sources 33, 33, . . . , 33, and thereby incidence of light from the other surface and leakage of light from the other surface of the light guide plate 5 are prevented.

Further, in the television receiving apparatus 100 according to Embodiment 2 of the present invention, by forming the cutout part 62 at the central part of the one edge of the first reflection sheet piece 6A, the end surface of the end part 61A is located at a distance of 2 mm from the one side surface 51 of the light guide plate 5 toward the other edge facing the one edge of the first reflection sheet piece 6A. Accordingly, the problems that the light guide plate 5 with the reflection sheet 6 and the light source unit 3 come close to each other in the vicinity of the central part of the light source unit 3, and the end surface of the end part 61A of the first reflection sheet piece 6A protruding from the light guide plate 5 abuts the light sources 33, 33, . . . , 33 so as to be deformed are prevented.

Furthermore, the television receiving apparatus 100 according to Embodiment 2 of the present invention is also configured in such a manner that, in the vicinity the central part of the light source unit 3 or in the vicinity of the central part of one edge of the first reflection sheet piece 6A, the light emitting surface 331 of the light sources 33, 33, . . . , 33 matches with the one side surface 51 of the light guide plate 5 in the facing direction, and in the thickness direction of the light guide plate 5, the dimensions of the light emitting surface 331 of the light sources 33, 33, . . . , 33 and the one side surface 51 of the light guide plate 5 are the same as each other. Accordingly, the light made incident on the light guide plate 5 from the one side surface 51 thereof is propagated therethrough while being totally reflected, light leakage through the other surface of the light guide plate 5 and the cutout part 62 is also prevented.

The same parts as those in Embodiment 1 will be denoted by the same reference numerals, and will not be described.

In the above description, the television receiving apparatus 100 is an example of the display apparatus. Further, the present embodiment may be widely applied to various electronic devices without being limited to the television receiving apparatus, for example, the electronic devices including a notebook type personal computer, a mobile phone, a smart phone, a personal digital assistant (PDA), a game machine, or the like.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A reflection sheet which reflects light made incident through a side surface of a light guide plate therein to a side of one surface of the light guide plate and is oppositely disposed to the other surface of the light guide plate, comprising:
a single cutout part provided at one edge thereof which is disposed on the side surface side of the light guide plate,
wherein
the single cutout part is formed in an entire range of the one edge except both end parts thereof,
in a direction crossing the side surface of the light guide plate, the both end parts of the one edge is more protruded than the side surface of the light guide plate, and
a central part of the one edge where the single cutout part is formed is more recessed than the side surface of the light guide plate in the direction.

2. The reflection sheet according to claim 1, wherein the cutout part is formed in a strip shape whose length direction is along the one edge.

3. The reflection sheet according to claim 2, wherein the cutout part has a maximum depth of 2 to 3 mm from the one edge to the other edge facing the one edge.

4. The reflection sheet according to claim 1, wherein the cutout part is formed in an arc shape.

5. The reflection sheet according to claim 4, wherein the cutout part has a maximum depth of 2 to 3 mm from the one edge to the other edge facing the one edge.

6. A light source device comprising:
a light source;
a light guide plate which emits light made incident on one side surface from the light source through one surface thereof; and
the reflection sheet according to claim 1,
wherein both ends of the one edge of the reflection sheet are configured to protrude to the light source side from the one side surface of the light guide plate.

7. The light source device according to claim 6, wherein a light emitting surface of the light source and the one side surface of the light guide plate have the same dimensions as each other in a thickness direction of the light guide plate, and
in at least a central part of the one side surface of the light guide plate, the light emitting surface of the light source and the one side surface of the light guide plate are disposed so as to opposite and match with each other.

8. A display apparatus comprising:
the light source device according to claim 6; and
a display panel which is provided on the one surface side of the light guide plate of the light source device, and displays an image using light made incident thereon through the light guide plate.

9. A reflection sheet which reflects light made incident through a side surface of a light guide plate therein to a side of one surface of the light guide plate and is oppositely disposed to the other surface of the light guide plate, comprising:

a plurality of reflection sheet pieces including one reflection sheet piece which is disposed on the side surface side of the light guide plate, wherein the one reflection sheet piece has one edge corresponding to the one side surface of the light guide plate, the one edge is provided with a single cutout part which is formed in an entire range of the one edge except both end parts thereof, in a direction crossing the side surface of the light guide plate, the both end parts of the one edge is more protruded than the side surface of the light guide plate, and a central part of the one edge where the single cutout part is formed is more recessed than the side surface of the light guide plate in the direction.

10. The reflection sheet according to claim 9, wherein the cutout part is formed in a strip shape whose length direction is along the one edge.

11. The reflection sheet according to claim 10, wherein the cutout part has a maximum depth of 2 to 3 mm from the one edge to the other edge facing the one edge.

12. The reflection sheet according to claim 9, wherein the cutout part is formed in an arc shape.

13. The reflection sheet according to claim 12, wherein the cutout part has a maximum depth of 2 to 3 mm from the one edge to the other edge facing the one edge.

14. The reflection sheet according to claim 9, wherein the plurality of reflection sheet pieces comprises a second reflection sheet piece comprising an end part.

15. The reflection sheet according to claim 14, wherein the end part of the second reflection sheet piece is slidably sandwiched between the one reflection sheet piece and the light guide plate.

* * * * *